United States Patent
Singh (10) Patent No.: US 10,711,741 B2
(45) Date of Patent: Jul. 14, 2020

(54) ASPIRATION SYSTEM FOR A WORK VEHICLE

(71) Applicant: CNH Industrial America, LLC, New Holland, PA (US)

(72) Inventor: Samrendra K. Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/901,966

(22) Filed: Feb. 22, 2018

(65) Prior Publication Data

US 2019/0257276 A1 Aug. 22, 2019

(51) Int. Cl.
*F02M 35/04* (2006.01)
*F02M 35/02* (2006.01)
(Continued)

(52) U.S. Cl.
CPC ......... *F02M 35/0216* (2013.01); *A01B 76/00* (2013.01); *A01D 41/1252* (2013.01); *A01D 75/00* (2013.01); *F01N 3/30* (2013.01); *F01N 3/303* (2013.01); *F01N 13/009* (2014.06); *F01N 13/08* (2013.01); *F02M 35/024* (2013.01); *F02M 35/04* (2013.01); *F02M 35/086* (2013.01); *A01D 41/06* (2013.01);
(Continued)

(58) Field of Classification Search
CPC ............ B01D 46/0065; B01D 46/2403; B01D 46/522; F02M 35/08; F01N 2590/08
See application file for complete search history.

(56) References Cited

U.S. PATENT DOCUMENTS 2,506,810 A * 5/1950 Ospina-Racines ........ F02D 9/02
123/1 R
3,104,962 A * 9/1963 Duer ...................... F02M 35/08
55/302
(Continued)

FOREIGN PATENT DOCUMENTS

DE 3502866 A1 3/1986
FR 1279334 A 12/1961
WO 2010104452 A1 9/2010

OTHER PUBLICATIONS

Extended European Search Report for EP Application No. 19158172.7 dated May 8, 2019 (six pages).

*Primary Examiner* — Matthew T Largi
(74) *Attorney, Agent, or Firm* — Peter Zacharias; Patrick Sheldrake (57) ABSTRACT

In one aspect, an aspiration system for a work vehicle may include an exhaust tube extending defining an exhaust passage therein. The exhaust tube may include a venturi portion, with the exhaust tube further defining an aperture within the venturi portion of the exhaust tube. The system may also include an aspiration tube configured to be coupled between the exhaust tube and a separate component of the work vehicle. The aspiration tube may define an aspiration passage extending between the separate component and the exhaust tube. The aperture defined by the exhaust tube may fluidly couple the aspiration passage and the exhaust passage. Furthermore, the system may include a restrictor body positioned within the exhaust passage. As such, the restrictor body and the venturi portion may be configured to adjust a flow parameter of exhaust gases flowing through the exhaust passage.

20 Claims, 3 Drawing Sheets

(51) Int. Cl.
  *A01B 76/00* (2006.01)
  *A01D 41/12* (2006.01)
  *A01D 75/00* (2006.01)
  *F02M 35/024* (2006.01)
  *F02M 35/08* (2006.01)
  *F01N 13/00* (2010.01)
  *F01N 13/08* (2010.01)
  *F01N 3/30* (2006.01)
  *A01D 41/06* (2006.01)
  *F02M 35/16* (2006.01)
  *F01N 1/00* (2006.01)
  *F01N 3/20* (2006.01)

(52) U.S. Cl.
  CPC .................. *F01N 1/00* (2013.01); *F01N 3/20* (2013.01); *F01N 2470/30* (2013.01); *F01N 2590/08* (2013.01); *F02M 35/164* (2013.01)

(56) References Cited

U.S. PATENT DOCUMENTS

| | | | |
|---|---|---|---|
| 3,137,553 A | 6/1964 | Billey | |
| 3,419,892 A * | 12/1968 | Wagner | F01N 1/02 123/198 R |
| 3,740,932 A | 6/1973 | Borsheim | |
| 3,866,580 A * | 2/1975 | Whitehurst | B62D 55/06 123/41.64 |
| 4,178,760 A * | 12/1979 | Alf | F01N 1/14 137/527 |
| 4,207,085 A * | 6/1980 | Clifton | B01D 46/0049 181/231 |
| 4,249,922 A | 2/1981 | Saele | |
| 4,325,460 A * | 4/1982 | Hoppenstedt | F01N 1/14 138/39 |
| 6,878,189 B2 * | 4/2005 | Moredock | B01D 45/16 55/345 |
| 7,645,432 B1 * | 1/2010 | Solomon | B01D 47/10 423/212 |
| 7,721,530 B2 * | 5/2010 | Holm | F01M 13/021 60/274 |
| 7,833,301 B2 | 11/2010 | Schindler et al. | |
| 8,720,195 B2 | 5/2014 | Gardner et al. | |
| 8,745,976 B2 | 6/2014 | Ochsner et al. | |
| 9,103,262 B2 | 8/2015 | Prenger et al. | |
| 9,434,245 B2 | 9/2016 | Mori et al. | |
| 2010/0000205 A1 * | 1/2010 | Freese, V | F01N 3/05 60/320 |
| 2012/0124980 A1 | 5/2012 | Prenger et al. | |
| 2017/0276101 A1 | 9/2017 | Morey | |

\* cited by examiner

ASPIRATION SYSTEM FOR A WORK VEHICLE

FIELD

The present disclosure generally relates to work vehicles and, more particularly, to aspiration systems for aspirating components of a work vehicle.

BACKGROUND

Work vehicles typically include internal combustion engines that require clean air for use within the combustion process. Since many work vehicles, such as harvesters and other agricultural work vehicles, operate in fields and other harvesting environments in which the ambient air contains large amounts of dust, plant matter, debris, particulates, and other particles, an air intake system providing effective air filtration is required. As such, air intake systems typically include a pre-cleaner positioned upstream of an air filter. In general, the pre-cleaner is configured to remove larger particles from the air entering the engine, while the air filter is configured to remove smaller particles that pass through the pre-cleaner.

Typically, the pre-cleaner is fluidly coupled to an aspiration or vacuum source, such as an exhaust tube of the work vehicle. As such, when exhaust gases flow through the exhaust tube, a vacuum is created within the pre-cleaner, which draws particles out of the air entering the engine of the work vehicle. However, the vacuum pressure provided to a pre-cleaner by conventional configurations is often inadequate, thereby limiting the amount of particles that can be removed from the incoming air by the pre-cleaner.

Accordingly, an improved aspiration system for a work vehicle that provides greater aspiration or vacuum to the vehicle's air intake or filtration system would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an aspiration system for a work vehicle. The system may include an exhaust tube extending along a flow direction from an upstream end to a downstream end. The exhaust tube may define an exhaust passage extending from the upstream end of the exhaust tube to the downstream end of the exhaust tube. The exhaust tube may include a venturi portion, with the exhaust tube further defining an aperture within the venturi portion of the exhaust tube. The aspiration system may also include an aspiration tube configured to be coupled between the exhaust tube and a separate component of the work vehicle. The aspiration tube may define an aspiration passage extending between the separate component and the exhaust tube. The aperture defined by the exhaust tube may fluidly couple the aspiration passage and the exhaust passage. Furthermore, the aspiration system may include a restrictor body positioned within the exhaust passage. As such, the restrictor body and the venturi portion may be configured to adjust a flow parameter of exhaust gases flowing through the exhaust passage.

In another aspect, the present subject matter is directed to a work vehicle. The work vehicle may include an engine and an air filtration system configured to filter air provided to the engine. The work vehicle may include an exhaust tube extending along a flow direction from an upstream end to a downstream end. The exhaust tube may define an exhaust passage extending from the upstream end of the exhaust tube to the downstream end of the exhaust tube. The exhaust tube may include a venturi portion, with the exhaust tube further defining an aperture within the venturi portion of the exhaust tube. The work vehicle may also include an aspiration tube configured to be coupled between the exhaust tube and a separate component of the work vehicle. The aspiration tube may define an aspiration passage extending between the separate component and the exhaust tube. The aperture defined by the exhaust tube may fluidly couple the aspiration passage and the exhaust passage. Furthermore, the work vehicle may include a restrictor body positioned within the exhaust passage. As such, the restrictor body and the venturi portion may be configured to adjust a flow parameter of exhaust gases flowing through the exhaust passage.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an aspiration system for a work vehicle. Specifically, in several embodiments, the aspiration system may include an exhaust tube defining an exhaust passage through which exhaust gases from an engine of the work vehicle may flow. The exhaust tube may include a venturi portion, with the exhaust tube further defining an aperture within the venturi portion. The aspiration system may also include an aspiration tube defining an aspiration passage therein, with the aspiration tube being configured to extend between the exhaust passage and a separate component of the work vehicle, such as a pre-cleaner of an air filtration system of the work vehicle. In this regard, the aperture defined by the venturi portion of the exhaust tube may fluidly couple the aspiration passage and the exhaust passage. As such, when exhaust gases flow through the exhaust passage of the exhaust tube, a vacuum may be created within the aspiration passage so as to aspirate or provide a vacuum to the pre-cleaner, thereby removing particles from air passing through the separate component. Furthermore, the aspiration system may include a restrictor body positioned within the exhaust passage. In general, the restrictor body may be configured to increase a speed of the exhaust gases flowing through the exhaust passage so as to increase the aspiration provided to the pre-cleaner. As such, the disclosed aspiration system may provide greater aspiration to the pre-cleaner than conventional aspiration systems.

It should be appreciated that, in general, the present subject matter will be described herein as aspirating the pre-cleaner of a vehicle's air filtration system. However, in other embodiments, the disclosed aspiration system may be utilized as an aspiration source for any other suitable component of the work vehicle.

Figure 1:
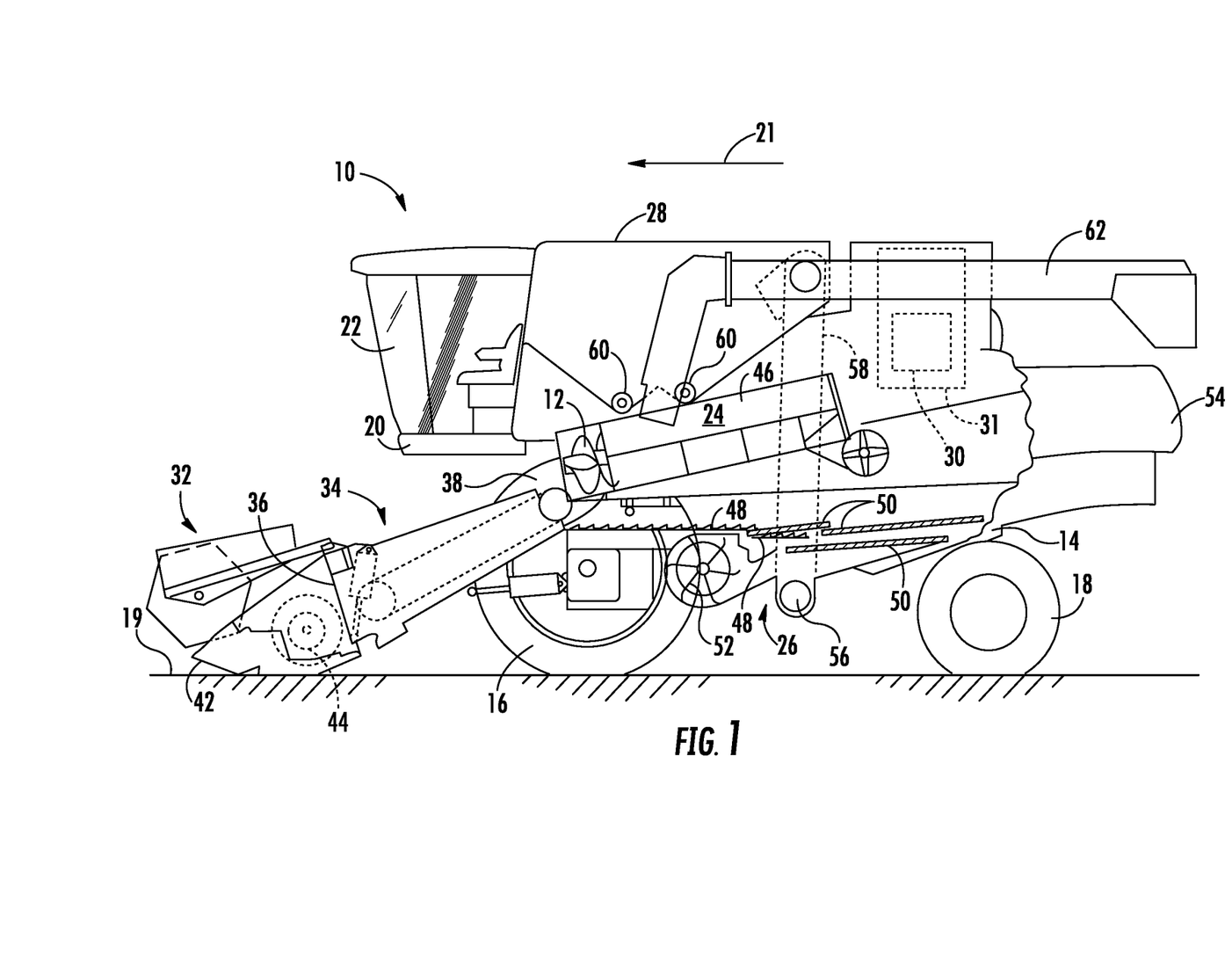
FIG. 1 illustrates a side view of one embodiment of work vehicle in accordance with aspects of the present subject matter.

Referring now to the drawings, FIG. 1 illustrates a simplified, partial sectional side view of one embodiment of a work vehicle 10. As shown, the work vehicle 10 may be configured as an axial-flow type combine in which crop material is threshed and separated while it is advanced by and along a longitudinally arranged rotor 12. The work vehicle 10 may include a chassis or main frame 14 having a pair of driven, ground-engaging front wheels 16 and a pair of steerable rear wheels 18. The wheels 16, 18 may be configured to support the work vehicle 10 relative to a ground surface 19 and move the work vehicle 10 in a forward direction of travel 21 relative to the ground surface 19. Additionally, an operator's platform 20 with an operator's cab 22, a threshing and separating assembly 24, a grain cleaning assembly 26, and a crop tank 28 may be supported by the frame 14. Furthermore, as is generally understood, the work vehicle 10 may include an engine 30 mounted on the frame 14 and positioned within an engine compartment 31. A transmission (not shown) may be operably coupled to the engine 30 and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the work vehicle 10 to allow the front end 36 of the feeder 34 and, thus, the header 32 to be moved upwardly and downwardly relative to the ground 19 to set the desired harvesting or cutting height for the header 32.

As the work vehicle 10 is propelled forwardly over a field with standing crop, the crop material is severed from the stubble by a sickle bar 42 at the front of the header 32 and delivered by a header auger 44 to the front end 36 of the feeder 34, which supplies the harvested crop to the threshing and separating assembly 24. As is generally understood, the threshing and separating assembly 24 may include a cylindrical chamber 46 in which the rotor 12 is rotated to thresh and separate the harvested crop received therein. That is, the harvested crop is rubbed and beaten between the rotor 12 and the inner surfaces of the chamber 46, whereby the grain, seed, or the like, is loosened and separated from the straw.

The harvested crop which has been separated by the threshing and separating assembly 24 falls onto a series of pans 48 and associated sieves 50, with the separated harvested crop being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that remove chaff and other impurities from the harvested crop. For instance, the fan 52 may blow the impurities off of the harvested crop for discharge from the work vehicle 10 through the outlet of a straw hood 54 positioned at the back end of the work vehicle 10.

The cleaned harvested crop passing through the sieves 50 may then fall into a trough of an auger 56, which may be configured to transfer the harvested crop to an elevator 58 for delivery to the associated crop tank 28. Additionally, in one embodiment, a pair of tank augers 60 at the bottom of the crop tank 28 may be used to urge the cleaned harvested crop sideways to an unloading tube 62 for discharge from the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
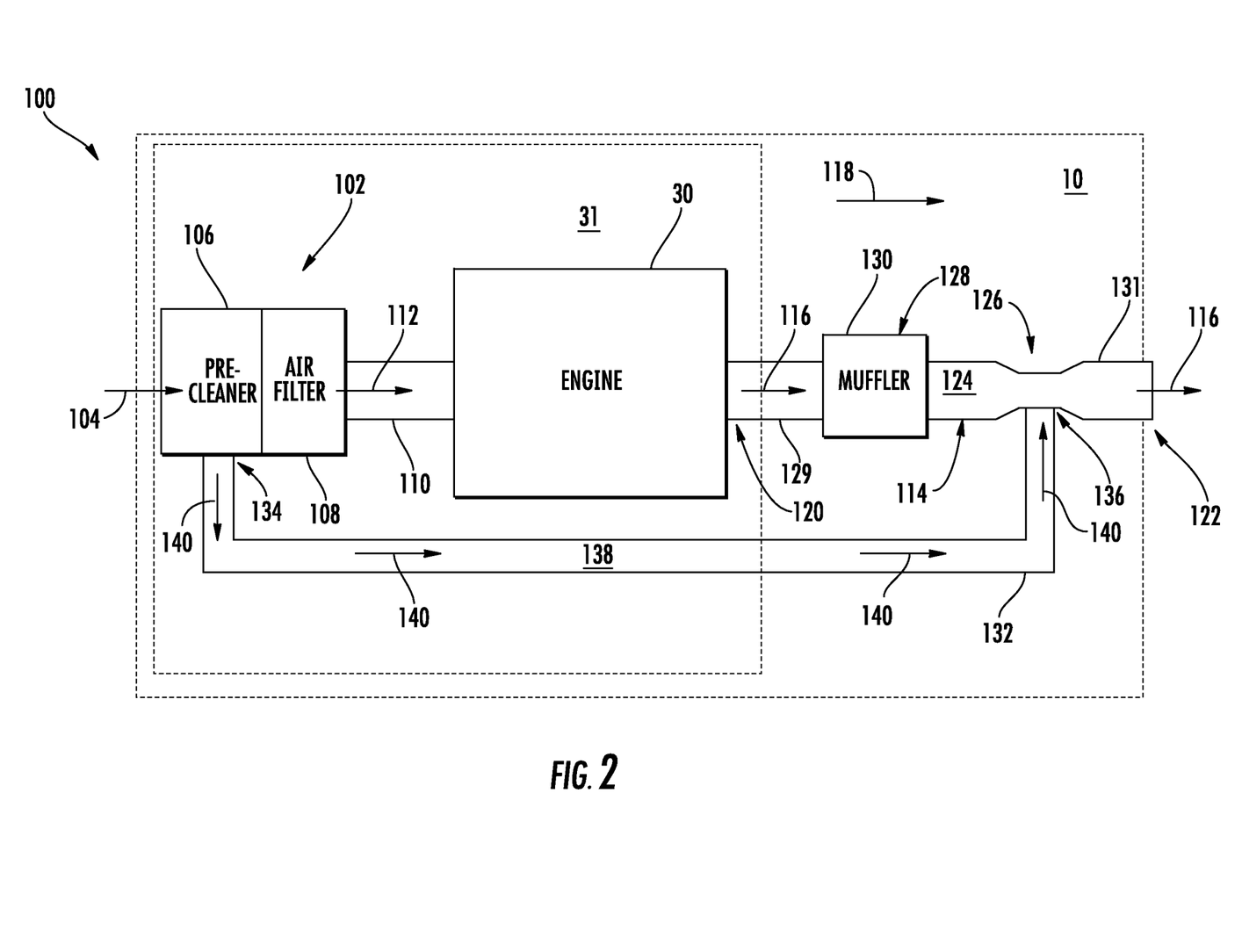
FIG. 2 illustrates a schematic view of one embodiment of an aspiration system for a work vehicle in accordance with aspects of the present subject matter.

Referring now to FIG. 2, a schematic, side view of one embodiment of an aspiration system 100 for aspirating a component of a work vehicle is illustrated in accordance with aspects of the present subject matter. In general, the aspiration system 100 will be described herein with reference to the work vehicle 10 described above with reference to FIG. 1. However, it should be appreciated by those of ordinary skill in the art that the disclosed system 100 may generally be utilized with work vehicles having any other suitable work vehicle configuration.

As shown in FIG. 2, the aspiration system 100 may include various components of the work vehicle 10. For example, in one embodiment, the aspiration system 100 may include the engine 30 of the work vehicle. However, it should be appreciated that, in alternative embodiments, the aspiration system 100 may include any other suitable components of the work vehicle 10.

Moreover, the aspiration system 100 may include an air filtration system 102 configured to filter intake air (e.g., as indicated by arrow 104 in FIG. 2) entering the engine 30 for use in the combustion process. Specifically, in several embodiments, the air filtration system 102 may include a pre-cleaner 106. In general, the pre-cleaner 106 may be configured to remove particles present in the intake air 104 flowing through the pre-cleaner 106. For example, as will be described below, the pre-cleaner 106 may be aspirated or provided with a vacuum that draws the particles present within the pre-cleaner 106 out of the flow of the intake air 104. The air filtration system 102 may also include an air filter 108 positioned downstream of the pre-cleaner 106. In general, the air filter 108 may be configured to remove particles remaining in the intake air 104 as the intake air 104 passes through the air filter 108. For example, in one embodiment, the air filter 108 may be at least partially formed from a fibrous, porous, or mesh material that permits the intake air 104 to flow through the air filter 108, while trapping or capturing particles still present in the intake air 104. Additionally, an intake conduit 110 may fluidly couple the air filtration system 102 and the engine 30 so as to provide filtered air (e.g., as indicated by arrow 112 in FIG. 2) from the air filtration system 102 to the engine 30 for use in the combustion process. However, it should be appreciated that, in alternative embodiments, the air filtration system 102 may have any other suitable configuration.

As shown in FIG. 2, the air filtration system 102 may be mounted or positioned within the engine compartment 31 of the work vehicle 10. However, one of ordinary skill in the art would appreciate that the air filtration system 102 may be mounted or positioned in any other suitable location of the work vehicle 10, such as outside of the engine compartment 31.

Furthermore, the aspiration system 100 may also include an exhaust tube 114 configured to convey exhaust gases (e.g., as indicated by arrows 116 in FIG. 2) from the engine 30 to a location outside of the engine compartment 31 of the work vehicle 10. Specifically, in several embodiments, the exhaust tube 114 may extend along a flow direction (e.g., as indicated by arrow 118 in FIG. 2) from an upstream end 120 of the exhaust tube 114 to a downstream end 122 of the exhaust tube 114. In general, the exhaust tube 114 may define an exhaust passage 124 extending from the upstream end 120 of the exhaust tube 114 to the downstream end 122 of the exhaust tube 114 through which the exhaust gases 116 may flow. As such, the upstream end 120 of the exhaust tube 114 may be coupled to the engine 30 (e.g., an exhaust manifold of the engine 30) such that the exhaust gases 116 flow into the exhaust passage 124 from the engine 30. The downstream end 122 of the exhaust tube 114 may generally be positioned outside of the engine compartment 31 and/or the work vehicle 10 so as to allow the exhaust gases 116 flowing through the exhaust tube 114 to be exhausted into an ambient atmosphere outside of the engine compartment 31 and/or the work vehicle 10. As will described below, the exhaust tube 114 may include a venturi portion 126 positioned between the upstream and downstream ends 120, 122 of the exhaust tube 114.

Moreover, the aspiration system 100 may include one or more exhaust gas conditioning devices 128. In general, the exhaust gas conditioning device(s) 128 may be configured to adjust or condition a characteristic (e.g., sound, chemical content, etc.) of the exhaust gases 116 flowing through the exhaust passage 124. For example, as shown in FIG. 2, in one embodiment, the exhaust gas conditioning device(s) 128 may be configured as a muffler 130. In this regard, as is generally understood, the muffler 130 may include various baffles, passages, acoustic insulation packets, and/or the like, which are configured to reduce an intensity or volume of a sound emitted by the exhaust gases 116 and/or the combustion process. However, it should be appreciated that, in alternative embodiments, the exhaust gas conditioning device(s) 128 may be configured as any other suitable exhaust gas conditioning device, such as a catalytic converter or a particulate filter. Furthermore, it should be appreciated that the aspiration system 100 may include a combination of any suitable exhaust gas conditioning devices 128. For example, in one embodiment, the aspiration system 100 may include a catalytic converter, a particulate filter, and the muffler 130.

In several embodiments, the exhaust gas conditioning device(s) 128 may be positioned at a location(s) upstream of the venturi portion 126 of the exhaust tube 114. For example, as shown in FIG. 2, the muffler 130 may be positioned such that an upstream exhaust tube section 129 of the exhaust tube 120 extends between the upstream end 120 of the exhaust tube 114 and the muffler 130 and a downstream exhaust tube section 131 of the exhaust tube 120 extends between the muffler 130 and the downstream end 122 of the exhaust tube 114. In such embodiment, the venturi portion 126 may be positioned within and/or form part of the downstream exhaust tube section 131. However, it should be appreciated that, in alternative embodiments, the exhaust gas conditioning device(s) 128 may be positioned and/or integrated within the exhaust tube 114 at any other suitable location, including location(s) downstream of the venture portion 126.

In accordance with aspects of the present subject matter, the aspiration system 100 may further include an aspiration tube 132. In general, and as will be described below, the aspiration tube 132 may be configured to aspirate or provide a vacuum to the pre-cleaner 106 so as to allow particles to be removed from the intake air 104 flowing through the pre-cleaner 106. Specifically, in several embodiments, the aspiration tube 132 may extend from an upstream end 134 of the aspiration tube 132 to a downstream end 136 of the aspiration tube 132. In general, the aspiration tube 132 may define an aspiration passage 138 extending from the upstream end 134 of the aspiration tube 132 to the downstream end 136 of the aspiration tube 132 through which aspiration air (e.g., as indicated by arrows 140 in FIG. 2) may flow so as to aspirate the pre-cleaner 106. As such, the upstream end 134 of the aspiration tube 132 may be coupled to the pre-cleaner 106 so that the aspiration air 140 flows into the aspiration passage 138 from the pre-cleaner 106. The downstream end 136 of the aspiration tube 132 may be coupled to the venturi portion 126 of the exhaust tube 114 such that the aspiration air 140 flows into the exhaust passage 124 from the aspiration passage 138. However, it should be appreciated that, in alternative embodiments, the upstream end 134 of the aspiration tube 132 may be coupled to any other suitable component of the work vehicle 10 that is separate from the exhaust tube 114 so as to provide aspiration to that component.

Figure 3:
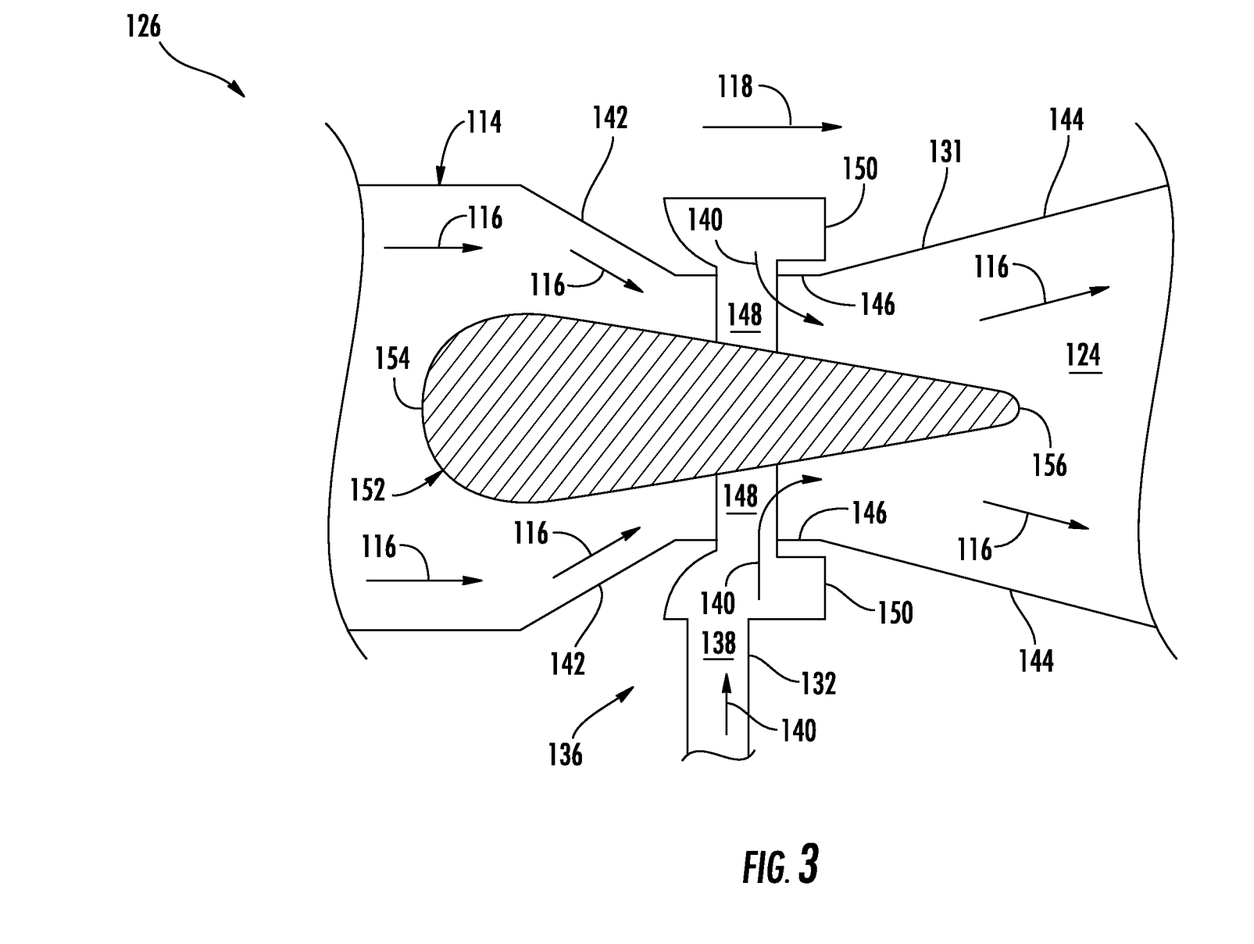
FIG. 3 illustrates a cross-sectional view of one embodiment of a venturi portion of an exhaust tube suitable for use within the disclosed aspiration system in accordance with aspects of the present subject matter, particularly illustrating a restrictor body positioned within the venturi portion of the exhaust tube.

Referring now to FIG. 3, a cross-sectional view of one embodiment of the venturi portion 126 of the exhaust tube 114 described above is illustrated in accordance with aspects of the present subject matter. As shown, the venturi portion 126 may include a converging section 142 and a diverging section 144. In general, a diameter of the exhaust tube 114 may narrow or contract along the flow direction 118 of the exhaust gases 116 within the converging section 142 of the venturi portion 126. Conversely, the diameter of the exhaust tube 114 may expand along the flow direction 118 of the exhaust gases 116 within the diverging section 144 of the venturi portion 126. Furthermore, the venturi portion 126 may include a throat 146 extending between the converging and diverging sections 142, 144. In this regard, the section of the exhaust passage 124 defined by the venturi portion 126 may contract and then expand along the flow direction 118 so as to increase the speed of the exhaust gases 116 that are flowing through the exhaust passage 124. As will be described below, the increased speed of the exhaust gases 116 through the venturi portion 126 may create a vacuum within the aspiration passage 138 of the aspiration tube 132.

Moreover, the venturi portion 126 of the exhaust tube 114 may define an aperture 148 that fluidly couples the exhaust passage 124 and the aspiration passage 138 so as to permit the aspiration air 140 to flow into the exhaust passage 124 from the aspiration passage 138. Specifically, in several embodiments, the aperture 148 may be at least partially defined by or through the throat 146 of the venturi portion 126. Furthermore, as shown in FIG. 3, in one embodiment, the aperture 148 corresponds to a circumferentially extending slot defined around a circumference of the exhaust tube 114. In such embodiment, an annular manifold 150 may be coupled between the aspiration tube 132 and the exhaust tube 114 such that the aspiration air 140 may flow into the exhaust passage 124 from the aspiration passage 138 throughout the entire circumference of the aperture 148. However, one of ordinary skill in the art would appreciate that, in alternative embodiments, the aperture 148 may have any other suitable shape or configuration and/or be defined by any other suitable region of the venturi portion 126. For example, in one embodiment, the aperture 148 may correspond to a slot extending around only a portion of the circumference of the exhaust tube 114. Additionally, in a further embodiment, the aperture 148 may be at least partially defined by and/or through the converging and/or diverging sections of the venturi portion 126.

In accordance with aspects of the present subject matter, the aspiration system 100 may include a restrictor body 152 positioned within the exhaust passage 124 of the exhaust tube 114. In general, the restrictor body 152 may extend between a leading edge 154 and a trailing edge 156, with the leading edge 154 being positioned upstream from the trailing edge 156 along the flow direction 118 of the exhaust gases 116 through the exhaust tube 114. In several embodiments, the restrictor body 152 may be at least partially positioned within a region of the exhaust passage 124 defined by the venturi portion 126 of the exhaust tube 114. For example, as shown in FIG. 3, in one embodiment, the restrictor body 152 may be positioned within the exhaust passage 124 such that a portion of the restrictor body 152 is aligned with the aperture 148 defined in the exhaust tube 114. In such embodiment, the aperture 148 may be positioned downstream of the leading edge 154 of the restrictor body 152 and upstream of the trailing edge 156 of the restrictor body 152. Furthermore, the restrictor body 152 may be positioned within the exhaust passage 124 such that the restrictor body 152 is concentric with the exhaust tube 114. Additionally, as shown in FIG. 3, the leading edge 154 of the restrictor body 152 may be positioned upstream of the converging section 142 of the venturi portion 126 such that a portion of the restrictor body 152 is positioned upstream of the venturi portion 126. However, it should be appreciated that, in alternative embodiments, the restrictor body 152 may be positioned at any other suitable location within the exhaust passage 124 that allows the restrictor body 152 to function as described herein.

In the embodiment shown in FIG. 3, the restrictor body 152 may generally define a teardrop or airfoil-like shape, with the upstream portion of the restrictor body 152 having a greater diameter than the downstream portion of the restrictor body 152. However, one of ordinary skill in the art would appreciate that the restrictor body 152 may define any other suitable shape. For example, in other embodiments, the restrictor body 152 may generally define an elliptical shape, a conical shape, a spherical shape, or combination of any of these shapes.

Referring now to FIGS. 2 and 3, as indicated above, in several embodiments, the aspiration system 100 may be configured to aspirate or provide a vacuum to the pre-cleaner 106 of the air filtration system 102 to remove particles from the intake air 104 flowing through the pre-cleaner 106. During operation of the work vehicle 10, the exhaust gases 116 produced by the engine 30 may flow through the exhaust passage 124 in the flow direction 118. In this regard, the restrictor body 152 and the venturi portion 126 may be configured to adjust a flow parameter of exhaust gases 116 flowing through the exhaust passage 124. For example, in one embodiment, the restrictor body 152 and the venturi portion 126 may be configured to increase the velocity or speed of the exhaust gases 116 as the exhaust gases 116 flow around the restrictor body 152 and through the venturi portion 126. More specifically, the restrictor body 152 may reduce the cross-sectional area of the exhaust passage 124 to increase the speed of the exhaust gases 116 flowing around the restrictor body 152. Similarly, the converging section 142 and the throat 146 of the venturi portion 126 may further reduce the cross-sectional area of the exhaust passage 124 to increase the speed of the exhaust gases 116 flowing therethrough. The increased speed of the exhaust gases 116 may reduce the a pressure within the exhaust passage 125 so as to generate a suction force that is applied to the aspiration tube 132, thereby drawing the aspiration air 140 through the aspiration passage 138 and aspirating or providing a vacuum to the pre-cleaner 106. The vacuum applied to the pre-cleaner 106 via the aspiration tube 132 may, in turn, draw particles out of the intake air 104 flowing through the pre-cleaner 106.

Moreover, as indicated above, the restrictor body 152 and the venturi portion 126 may be configured to reduce the cross-sectional area of the exhaust passage 124. In particular, the restrictor body 152 may direct the exhaust gases 116 radially outward toward the exhaust tube 114. Conversely, the venturi portion 126 may direct the exhaust gases radially inward toward a center of the exhaust passage 124. By directing a portion of the exhaust gases 116 outward and a portion of the exhaust gases 116 inward as opposed to directing the same volume of the exhaust gases 116 either entirely inward or entirely outward, the aspiration system 100 may reduce turbulence in the exhaust gases 116 flowing through exhaust passage 124.

Additionally, the aspiration system 100 may reduce a back pressure in the exhaust passage 124 acting on the engine 30, thereby improving the fuel efficiency of the engine 30 and/or the work vehicle 10. Specifically, as mentioned above, the aperture 148 defined by the exhaust tube 114 may fluidly couple the exhaust passage 124 and the aspiration passage 138. As such, by drawing the aspiration air 140 into the exhaust passage 124 through the circumference of the exhaust tube 114 as opposed to a location at the center of the exhaust passage 124, the back pressure within the exhaust passage 124 acting on the engine 30 may be reduced.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aspiration system for a work vehicle, the aspiration system comprising:
    an exhaust tube extending along a flow direction from an upstream end to a downstream end, the exhaust tube defining an exhaust passage extending from the upstream end of the exhaust tube to the downstream end of the exhaust tube, the exhaust tube including a venturi portion comprising a converging section, a diverging section downstream of the converging section in the flow direction, and a throat extending between the converging and diverging sections, the exhaust tube further defining an aperture within the venturi portion of the exhaust tube;
    an aspiration tube configured to be coupled between the exhaust tube and a separate component of the work vehicle, the aspiration tube defining an aspiration passage extending between the separate component and the exhaust tube, the aperture defined by the exhaust tube fluidly coupling the aspiration passage and the exhaust passage; and
    a restrictor body positioned within the exhaust passage, the restrictor body including a leading edge and a trailing edge positioned downstream of the leading edge in the flow direction, the leading edge being positioned upstream of the venturi portion and the trailing edge being positioned downstream of the converging section of the venturi portion,
    wherein the restrictor body and the venturi portion are configured to adjust a flow parameter of exhaust gases flowing through the exhaust passage,
    wherein the aperture is positioned downstream of the leading edge of the restrictor body and upstream of the trailing edge of the restrictor body, and
    wherein the aperture is at least partially defined by the throat.

2. The system of claim 1, wherein the restrictor body extends within the venturi portion of the exhaust tube such that the aperture is aligned with a portion of the restrictor body along the flow direction.

3. The system of claim 1, wherein the aperture corresponds to a circumferentially extending slot extending around a circumference of the exhaust tube.

4. The system of claim 1, further comprising:
    an exhaust gas conditioning device positioned within the exhaust tube, wherein the venturi portion of the exhaust tube is positioned downstream of the exhaust gas conditioning device.

5. The system of claim 1, wherein the trailing edge of the restrictor body is positioned within the diverging section of the venturi portion.

6. The system of claim 1, wherein the separate component of the work vehicle corresponds to an air filter pre-cleaner.

7. The system of claim 1, wherein the restrictor body and the venturi portion are configured to increase a flow velocity of the exhaust gases flowing through the exhaust passage to increase a vacuum pressure being applied through the aspiration tube.

8. The system of claim 1, wherein the restrictor body is configured as an airfoil-shaped body positioned within the exhaust tube such that the exhaust gases are directed around an exterior of the airfoil-shaped body.

9. The system of claim 1, wherein the restrictor body is positioned within the exhaust tube such that the exhaust gases are directed from the leading edge of the restrictor body to the trailing edge of the restrictor body through a gap defined radially between an exterior of the restrictor body and an inner surface of the exhaust tube around an outer perimeter of the restrictor body.

10. A work vehicle, comprising:
    an engine;
    an air filtration system configured to filter air provided to the engine;
    an exhaust tube extending along a flow direction from an upstream end to a downstream end, the downstream end of the exhaust tube being open to the atmosphere, the exhaust tube defining an exhaust passage extending from the upstream end of the exhaust tube to the downstream end of the exhaust tube, the exhaust tube including a venturi portion comprising a converging section, a diverging section downstream of the converging section in the flow direction, and a throat extending between the converging and diverging sections, the exhaust tube further including an aperture at least partially defined by the throat of the venturi portion of the exhaust tube;
    an aspiration tube fluidly coupled between a component of the air filtration system and the exhaust tube, the aspiration tube defining an aspiration passage extending between the component of the air filtration system and the exhaust tube, the aperture defined by the exhaust tube fluidly coupling the aspiration passage and the exhaust passage; and
    a restrictor body positioned within the exhaust passage, the restrictor body including a leading edge and a trailing edge positioned downstream of the leading edge in the flow direction, the leading edge being positioned upstream of the venturi portion,
    wherein the restrictor body and the venturi portion are configured to adjust a flow parameter of exhaust gases flowing through the exhaust passage.

11. The work vehicle of claim 10, wherein the restrictor body is at least partially positioned within the venturi portion of the exhaust tube such that the aperture is aligned with a portion of the restrictor body along the flow direction.

12. The work vehicle of claim 10, wherein the aperture corresponds to a circumferentially extending slot extending around a circumference of the exhaust tube.

13. The work vehicle of claim 10, further comprising:
    an exhaust gas conditioning device positioned within the exhaust tube, wherein the venturi portion of the exhaust tube is positioned downstream of the exhaust gas conditioning device.

14. The work vehicle of claim 10, wherein the trailing edge of the restrictor body is positioned downstream of the converging section of the venturi portion.

15. The work vehicle of claim 14, wherein the trailing edge of the restrictor body is positioned within the diverging section of the venturi portion.

16. The work vehicle of claim 10, wherein the aspiration tube is fluidly coupled to a pre-cleaner of the air filtration system.

17. The work vehicle of claim 10, wherein the restrictor body and the venturi portion are configured to increase a flow velocity of the exhaust gases flowing through the exhaust passage to increase a vacuum pressure being applied through the aspiration tube.

18. The work vehicle of claim 10, wherein the restrictor body is configured as an airfoil-shaped body positioned within the exhaust tube such that the exhaust gases are directed around an exterior of the airfoil-shaped body.

19. The work vehicle of claim 10, wherein the restrictor body is positioned within the exhaust tube such that the exhaust gases are directed from the leading edge of the restrictor body to the trailing edge of the restrictor body through a gap defined radially between an exterior of the restrictor body and an inner surface of the exhaust tube around an outer perimeter of the restrictor body.

20. An aspiration system for a work vehicle, the aspiration system comprising:

an exhaust tube extending along a flow direction from an upstream end to a downstream end, the exhaust tube defining an exhaust passage extending from the upstream end of the exhaust tube to the downstream end of the exhaust tube, the exhaust tube including a venturi portion comprising a converging section, a diverging section downstream of the converging section in the flow direction, and a throat extending between the converging and diverging sections, the exhaust tube further defining an aperture within the venturi portion of the exhaust tube;

an aspiration tube configured to be coupled between the exhaust tube and a separate component of the work vehicle, the aspiration tube defining an aspiration passage extending between the separate component and the exhaust tube, the aperture defined by the exhaust tube fluidly coupling the aspiration passage and the exhaust passage; and a restrictor body positioned within the exhaust passage, the restrictor body including a leading edge and a trailing edge positioned downstream of the leading edge in the flow direction, the leading edge being positioned upstream of the venturi portion and the trailing edge being positioned downstream of the converging section of the venturi portion, wherein the restrictor body and the venturi portion are configured to adjust a flow parameter of exhaust gases flowing through the exhaust passage, and wherein the restrictor body is positioned within the exhaust tube such that the exhaust gases are directed from the leading edge of the restrictor body to the trailing edge of the restrictor body through a gap defined radially between an exterior of the restrictor body and an inner surface of the exhaust tube around an outer perimeter of the restrictor body; and wherein the aperture is at least partially defined by the throat.

* * * * *